United States Patent [19]

Mills et al.

[11] Patent Number: 4,716,538

[45] Date of Patent: Dec. 29, 1987

[54] MULTIPLY/DIVIDE CIRCUIT FOR ENCODER PCM SAMPLES

[75] Inventors: Jeffrey P. Mills, Oak Park; Max S. Macrander, Warrenville, both of Ill.

[73] Assignee: GTE Communication Systems Corporation, Phoenix, Ariz.

[21] Appl. No.: 687,892

[22] Filed: Dec. 31, 1984

[51] Int. Cl.⁴ ............................................. G06F 7/52
[52] U.S. Cl. .................................... 364/754; 364/765
[58] Field of Search ............... 364/754, 757, 761, 764, 364/748, 765

[56] References Cited

U.S. PATENT DOCUMENTS

| | | | |
|---|---|---|---|
| 3,829,673 | 8/1974 | Bouton, Jr. et al. | 364/748 |
| 4,004,140 | 1/1977 | Izumi et al. | 364/761 |
| 4,118,785 | 10/1978 | Izumi et al. | 364/761 |
| 4,357,674 | 11/1982 | Ikeda et al. | 364/768 |
| 4,374,427 | 2/1983 | Katayama | 364/764 |
| 4,484,259 | 11/1984 | Palmer et al. | 364/748 |

FOREIGN PATENT DOCUMENTS 3232558 3/1984 Fed. Rep. of Germany ...... 364/754

*Primary Examiner*—Gary V. Harkcom
*Assistant Examiner*—Dale M. Shaw
*Attorney, Agent, or Firm*—Gregory G. Hendricks; Peter Xiarhos

[57] ABSTRACT

A circuit multiplies or divides pulse code modulation (PCM) samples in D2 format. An exponent adder/subtractor provides the sum/difference of the exponents of the two numbers. A mantissa multiplier/divider circuit determines the product/quotient of the two mantissas and a sign generator provides a sign value for the resultant product/quotient of the two numbers. A normalizer circuit ensures that the product/quotient mantissa has a predetermined range of values.

17 Claims, 4 Drawing Figures

MULTIPLY/DIVIDE CIRCUIT FOR ENCODER PCM SAMPLES

MULTIPLY/DIVIDE CIRCUIT FOR ENCODED PCM SAMPLES CROSS REFERENCE TO RELATED APPLICATIONS

The present application is related to the following copending and concurrently filed applications:

Ser. No. 06/687,877 filed Dec. 31, 1984, entitled Adder Circuit for Encoded PCM Samples Ser. No. 06/687,875 filed Dec. 31, 1984, entitled Multiplier Circuit for Encoded PCM Samples Ser. No. 06/687,874 filed Dec. 31, 1984, entitled Divider Circuit for Encoded PCM Samples All of these inventions were invented by the same inventors and assigned to the same assignee.

FIELD OF THE INVENTION

The present invention relates to PCM signal processing circuitry and more particularly to a circuit for multiplying/dividing directly on D2 encoded PCM samples.

BACKGROUND OF THE INVENTION

Prior art techniques for multiplying/dividing D2 encoded PCM samples require conversion of the eight bit D2 encoded PCM sample into a thirteen bit linear coded sample. These samples are then multiplied or divided, depending upon the condition of a function control bit, and the resultant value is then reconverted to an eight bit D2 encoded number.

The present invention discloses a novel arrangement for performing multiply/divide operations directly on the D2 encoded PCM samples without the requirement of first converting them to linear code and then reconverting the results of the numerical operation back to D2 code. Under the present invention, the D2 encoded PCM samples are interpreted to be in the form of floating point numbers. After the numerical operations have been performed the resultant number is normalized to account for an implied magnitude bit. Division is performed through multiplication with the reciprocal of the divisor, which is found from a table in read-only-memory (ROM).

SUMMARY OF THE INVENTION

In accordance with the present invention, a multiplier/divider circuit is provided for use in a digital signal processing system which includes a processing unit operated to provide multiply and divide control signals, a source of pulse code modulation (PCM) samples and a source of multiplier/divisor numbers, each sample and number having a sign bit, a plurality of exponent bits and a plurality of mantissa bits.

The multiplier/divider circuit comprises a read-only-memory (ROM) connected to the source of multiplier/divisor numbers and operated in response to each of those numbers to provide the reciprocal thereof. Also included is a data selector connected to the processing unit, to the ROM and to the source of multiplier/divisor numbers. An adder circuit and a multiplier circuit are both connected to the source of PCM samples and the data selector.

The data selector is operated in response to the multiply control signal to gate the multiplier/divisor exponent bits to the adder circuit and the multiplier/divisor mantissa bits to the multiplier circuit, whereby the gated multiplier/divider represents a multiplier. The data selector is further operated in response to the divide control signal to gate the exponent bits of the reciprocal to the adder circuit and the mantissa bits of the reciprocal to the multiplier circuit, whereby the gated reciprocal represents a reciprocal divisor.

The adder circuit is operated to add the multiplier exponent bits to the PCM sample exponent bits and the multiplier circuit is operated to multiply the multiplier mantissa bits by the PCM sample mantissa bits in order to effectuate multiplication thereof. The adder is further operated to add the exponent bits of the divisor reciprocal to the PCM sample exponent bits and the multiplier is further operated to multiply the mantissa bits of the divisor reciprocal by the PCM sample mantissa bits in order to effectuate division of the PCM sample.

DESCRIPTION OF THE PREFERRED EMBODIMENT

Figure 1:
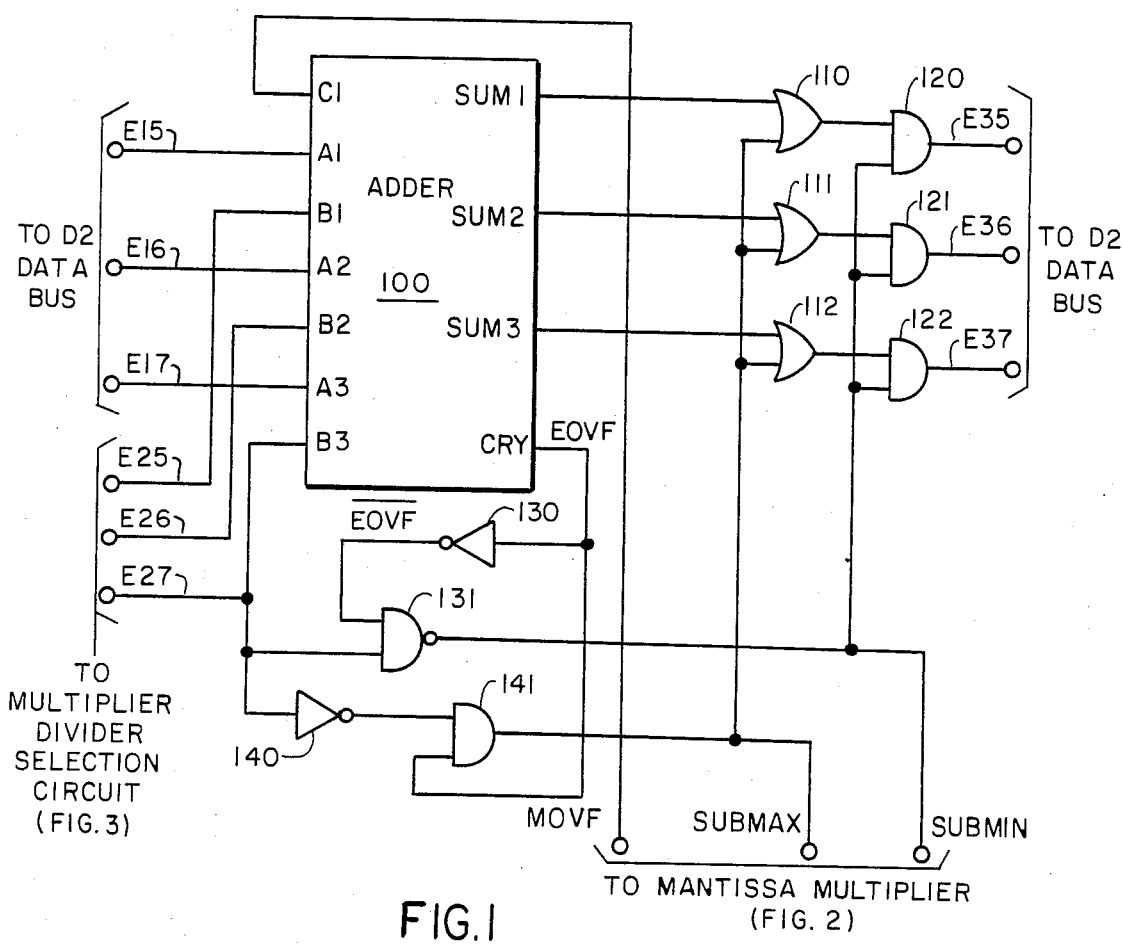
FIG. 1 of the accompanying drawing is a combined block and logic diagram of the exponent two's-complement adder-subtractor circuit of the present invention.

The circuit disclosed in the present invention operates directly on the D2 formatted samples without the need for conversion to linear code and reconversion to D2 code. In the D2 formatted "mu" law compressed code, bit positions have the following significance:

| SIGN | SEGMENT BITS | | | MAGNITUDE BITS | | | |
|------|----|----|----|----|----|----|----|
| ± | S1 | S2 | S3 | M4 | M3 | M2 | M1 |

The three segment bits are used to indicate which of the eight possible segments contains the "mu" law encoded sample. The four magnitude bits are used to indicate one of the sixteen equally spaced locations within a particular segment. Magnitude bits M4-M1 are assigned weights of $2^{-1}$-$2^{-4}$. A fifth magnitude bit having the weight of ($2^0$) is always implied and therefore it is not included in the D2 code. For example, the number 11011010 is negative (1 in the sign bit position) and is located in the fifth segment (101 in the segment bits) and in the tenth position (1010 in the magnitude bits) of that segment.

However, this number may be equally well interpreted as being a binary floating point number having a negative value (1 in the sign bit position) an exponent represented by segment bits 101 and a mantissa represented by magnitude bits 1010. These mantissa bits are similarly weighted from $2^{-1}$ to $2^{-4}$. With this arrangement the floating point number has a value of $K \times 2^{-5} \times (1 + \frac{1}{2} + \frac{1}{8})$ volts, where the mantissa value of 1 is defined as an implified bit, the mantissa value of $\frac{1}{2}$ is represented by the first bit of the mantissa (first nonzero bit) as weighted by $2^{-1}$ and the mantissa value of $\frac{1}{8}$ is equal to the third bit of the mantissa (second nonzero bit) as weighted by $2^{-3}$. The K factor determines the maximum value of the sample but it has no effect on the numerical floating point operations since all numbers have equal K factors in this application. Typically, K=1.

Each of the D2 encoded samples that is operated on by the present invention is referred to as Word #1. This word represents the multiplicand or dividend. The bits of Word #1 are referenced as S18, sign bit, E17, E16, and E15, exponent bits, and M14, M13, M12 and M11, mantissa bits.

The multiplier-divider word operating on the D2 formatted number is referred to as Word #2. In this application the bits of Word #2 are referenced as S28, sign bit, E27, signed exponent bit, E26 and E25, exponent bits, and M24, M23, M22 and M21 mantissa bits. The exponent sign bit is required since the multiplier/divisor in practical application covers a range of numbers from fractional to larger than 1. In the case of fractional numbers, the exponents are actually negative whole numbers since the mantissa (with the implied bit) is always larger than 1. Therefore, in order to be able to express these negative numbers, signed two's-complement notation was chosen in this partial application. Thus, bit S28 represents the value −4 when it is in the logic "1" state.

Similarly, the output word provided by the present invention is referred to as Word #3 and has corresponding bit notations of S38, sign bit, 37, E36 and E35, exponent bits, and M34, M33, M32 and M31, mantissa bits. This word represents the product or quotient.

When multiplying a D2 encoded sample, rules similar to those of floating point multiplication are applied. Therefore, the exponents are added and the sum of the exponents is then selected for the output exponent E35-E37.

The mantissa's, M11-M15 and M21-M25, are subsequently multiplied. The resultant mantissa, M31A-M35A, must be greater than or equal to 1 and less than 2. Therefore, if the resultant mantissa, M31A-M35A, is greater than or equal to 2, a carry bit is generated. This bit is added to the exponent, E35-E37, and therefore the resultant mantissa, M31A-M35A, is shifted down by 1 bit position. If the exponent, E35-E37, then overflows, the maximum number (all ones in all bit positions except the sign bit) is generated.

In the case of division, the exponents could be subtracted and the mantissas divided. In this case the resulting mantissa can become <1. Therefore, it must be renormalized (1 place left shift) and 1 must be subtracted from the exponent. If the single exponent value underflows, the minimum number must be substituted. However, division through multiplication with the reciprocal of the divider, as in the present invention, requires less circuitry since only the extreme case for multiplication as mentioned above needs consideration.

Referring now to FIG. 1 the exponent adder-subtractor circuit of the present invention is shown. This circuit includes adder 100 which has a carry (C1) input, A1-A3 inputs, B1-B3 inputs, SUM1-SUM3 outputs and a carry (CRY) output. The C1 input is connected to the mantissa multiplier circuit of FIG. 2 via the mantissa overflow (MOVF) lead. The A1-A3 inputs are connected to the D2 data bus via E15-E17 leads and the B1-B3 inputs are connected to the multiplier/divider selection circuit of FIG. 3. The SUM1-SUM3 outputs are connected to the first input of OR gates 110-112, respectively. The outputs of OR gates 110-112 are then connected to the first input of AND gates 120-122, respectively. The CRY output is connected to inverter 130 and the second input of AND gate 141 via the exponent overflow ($\overline{\text{EOVF}}$) lead. The B3 input is further connected to inverter 140 and the second input of NAND gate 131 via the E27 lead. Inverter 130 is connected to the first input of NAND gate 131 via the $\overline{\text{EOVF}}$ lead and inverter 140 is connected to the first input of AND gate 141 via the $\overline{\text{E27}}$ lead. AND gate 141 is connected to the second input of OR gates 110-112 via the SUBMAX lead. NAND gate 131 is connected to the second input of AND gates 120-122 via the SUBMIN lead. NAND gate 131 and AND gate 141 are further connected to the mantissa multiplier of FIG. 2 via the SUBMIN and SUBMAX leads, respectively, and AND gates 120-122 are connected to the D2 data bus via the E35-E37 leads, respectively. The exponent adder-subtractor circuit performs exponent addition or subtraction through two's-complement addition.

Since the three bit multiplier and divider exponent has been selected in this application to be in two's-complement notation, although other notations might have possibly been used, the most significant bit (E27) represents the exponent sign bit and it also has a weight of $-2^2=-4$. The E26 and E25 bits have weights of $2^1=2$ and $2^0=1$, respectively. Thus, the notation 110 represents an exponent having a value of $-4+2+0=-2$. Similarly, the notation 010 represents an exponent having a value of $-0+2+0=+2$. Thus the exponent has a range of values of $100=-4$ to $011=+3$. The 4 bit mantissa consisting of bits M24, M23, M22 and M21, in order of significance, has an implied bit located to the left of the binary point and four fractional bits. Thus the mantissa covers a range of values of $1.0000=1$ to $1.1111=1+\frac{1}{2}+\frac{1}{4}+\frac{1}{8}+1/16=1\ 15/16$. The arrangement of bits of the floating point multiplier/divider is written in the format of a sign bit and a two's-complement 3 bit exponent located to the left of the binary point and the 4 fractional mantissa bits to the right of the binary point since the implied mantissa bit need not be indicated. Thus the floating point multiplier/divisor has a range from a minimum of $100.0000=2^{-4}=+1/16$ to a maximum of $011.1111=2^3\times(1\ 15/16)=8\times(31/16)=\pm(15\frac{1}{2})$.

The three bit exponent of Word #1 (E17-E15) is added to the three bit exponent of Word #2 or its reciprocal (E27-E25) by adder 100. The D2 format for pulse code modulation (PCM) Word #1 has the following weights assigned to to its exponent bits: $\overline{\text{E17}}=-4$, $\overline{\text{E16}}=-2$ and $\overline{\text{E15}}=-1$. Therefore, if exponent bits E17-E15 have values of 010 then the exponent has a value of $-4+0-1=-5$. Similarly, if the exponent bits have values of 000 then the exponent has a total value of $31\ 4-3-1=-7$ and if the exponent bits have values of 111 then the exponent has a total value of $-0-0-0=0$. Thus, the exponent of Word #1 is represented in one's-complement notation.

This notaion is used because the maximum value of the analog voltage of the PCM sample equals approximately 2. Therefore, in normalized form without showing the implied mantissa bit, the absolute value of the maximum analog voltage can be represented as 111.1111. The three exponent bits to the left of the binary point represent an exponent value of 0 and the four fractional mantissa bits have values of $\frac{1}{2}$, $\frac{1}{4}$, $\frac{1}{8}$, and 1/16. Thus the exponential factor for the analog voltage can be represented as $2^0$ and the conventional normalized mantissa (implied bit shown) can be represented as $1+\frac{1}{2}+\frac{1}{4}+\frac{1}{8}+1/16=1\ 15/16$. Therefore the maximum analog voltage is represented in floating point form as $2^0\times(1\ 15/16)=1\ 15/16$ which is approximately 2.

The minimum value for the analog voltage can be represented as 000.0000 with a resultant exponent value of $-7$ and fractional mantissa bit values of 0, 0, 0, 0. Thus the analog voltage can be represented with the conventional normalized mantissa (implied bit shown) as $2^{-7}\times1+0+0+0+0=2^{-7}\times1=2^{-7}=1/128$. Therefore the analog voltage range being covered is 1/128 volts thru 1 15/16 volts.

However, adder 100 adds Word #1 which has an exponent in one's-complement notation to Word #2 or its reciprocal which in this application has an exponent in two's-complement notation. The result of the addition must produce an exponent in one's-complement notation for proper PCM coding in the D2 format. Rather than converting one of the words to the same notational form as the other in order to perform addition in the same notational scheme, the present invention adds the two words directly by utilizing the following algorithm: (1) if adder 100 produces a sum exponent having a value greater than zero, i.e., binary 111, this sum is replaced with the maximum allowed exponent of binary 111; and (2) if adder 100 produces a sum exponent having a value less than $-7$, i.e., binary 000, this sum is replaced with the minimum allowed value of binary 000.

The logical operations performed by the exponent adder-subtractor are derived from the following table:

| PCM SAMPLE EXPONENT | 111(0) | 110(−1) | 001(−6) |
|---|---|---|---|
| MULTIPLIER EXPONENT | +001(+1) | +001(+1) | +111(−1) |
| [ ] OVERFLOW CARRY | [1]000(>0) | [0]111(0) | [1]000(−7) |
|  | SUBSTITUTE | OK | OK |
|  | MAXIMUM=111 | ACCEPT 111 | ACCEPT 000 |
|  | 000(−7) | 111(0) | 111(0) |
|  | +111(−1) | +111(−1) | +011(3) |
|  | [0]111(<−7) | [1]110(−1) | [1]010(>0) |
|  | SUBSTITUTE | OK | SUBSTITUTE |
|  | MINIMUM=000 | ACCEPT 110 | MAXIMUM=111 |

Thus, the exponent adder-subtractor circuit applies the following logical rules: (1) if the multiplier exponent is positive and a carry condition results from the exponent addition, substitute the maximum PCM value (111) for the product/quotient exponent; (2) if the multiplier exponent is negative and a carry condition does not result from the exponent addition, substituted the minimum PCM value (000) for the product/quotient exponent; and (3) in all other cases, use the results of the exponent addition for the product/quotient exponent.

By the use of this algorithm, the product/quotient exponent is provided in correct D2 format without conversion of the exponent of the multiplier (Word #2), multiplicand (PCM sample word, Word #1) or product/quotient to a different code. The logic equations for these maximum and minimum substitutions are as follows:

SUBMIN=E27.$\overline{\text{OVF}}$

SUBMAX=$\overline{\text{E27}}$.OVF

Thes equations are implemented by NAND gate 131 and inverter 140 and AND gate 141.

The exponent bits of Word #1 are received from the D2 data bus and appear at the A1-A3 inputs of adder 100 in one's-complement format. The exponent bits for Word #2 are received from the multiplier-divider selection circuit and appear at the B1-B3 inputs of adder 100 in two's-complement format. Adder 100 adds the exponent bits of Word #1 to those of Word #2 and provides the sum therefore at outputs SUM1-SUM3.

The signals appearing at these outputs represent the exponent bits for the product/quotient exponent and are applied to the first input of OR gates 110-112. If AND gate 141 provides a logic level 0 signal on the SUBMAX lead then the signals provided at the SUM-1-SUM3 outputs are gated by gates 110-112 to the first input of AND gates 120-122, respectively. Similarly, if NAND gate 131 applies a logic level 1 signal to the SUBMIN lead AND gates 120-122 gate the exponent bits from OR gates 110-112 to the D2 data bus via lead E35-37. Thus the exponent bits for the product/quotient appear on leads E35-E37.

However, if there is no exponent overflow condition as indicated by logic level 0 signal at the carry (CRY) output then a logic level 0 signal appears on the EOVF lead. Inverter 130 then applies logic level 1 signal to the $\overline{\text{EOVF}}$ lead. This logic level 1 signal then appears at the first input of NAND gate 131. If a logic level 1 signal also appears at the most significant exponent bit (E27), then that logic level 1 signal also appears at the second input of NAND gate 131. Consequently, a logic level 0 signal appears on the SUBMIN lead. This logic level 0 signal then appears at the second input of AND gates 120-122, causing them to provide logic level 0 signals on leads E35-E37. Thus the minimum value (000) for the exponent bits of the product/quotient word (Word #3) appear on lead E35-E37 when there is no exponent overflow and the most significant bit of the exponent of Word #2 is a 1.

Similarly if there is an overflow condition as indicated by logic level 1 signal at the CRY output then this logic level 1 signal appears on the EOVF lead and consequently at the second input of AND gate 141. If the most significant bit of the exponent of Word #2 (E27) is at logic level 0 then that signal is inverted to a logic level 1 by inverter 140 and applied to the first input of AND gate 141. Consequently AND gate 141 provides a logic level 1 signal to the SUBMAX lead and this logic level 1 signal appears at the second input of OR gates 110-112. These OR gates then apply logic level 1 signals to the first input of AND gate 120 which then gates them to leads E35-E37 since NAND gate 131 provides a logic level 1 signal under these conditions. Thus, the maximum value (111) for the exponent bits of the product/quotient word (Word #3) is provided when there is an exponent overflow and the most significant bit of the exponent of Word #2 (E27) is at a logic level 0.

If a mantissa overflow condition occurs when the mantissas of Word #1 and Word #2 are multiplied together then the logic level 1 signal also appears on the mantissa overflow (MOVF) lead. Consequently this logic level 1 signal would appear at the carry (C1) input of adder 100 and would be added together with the exponent bits of Word #1 and Word #2.

Figure 2:
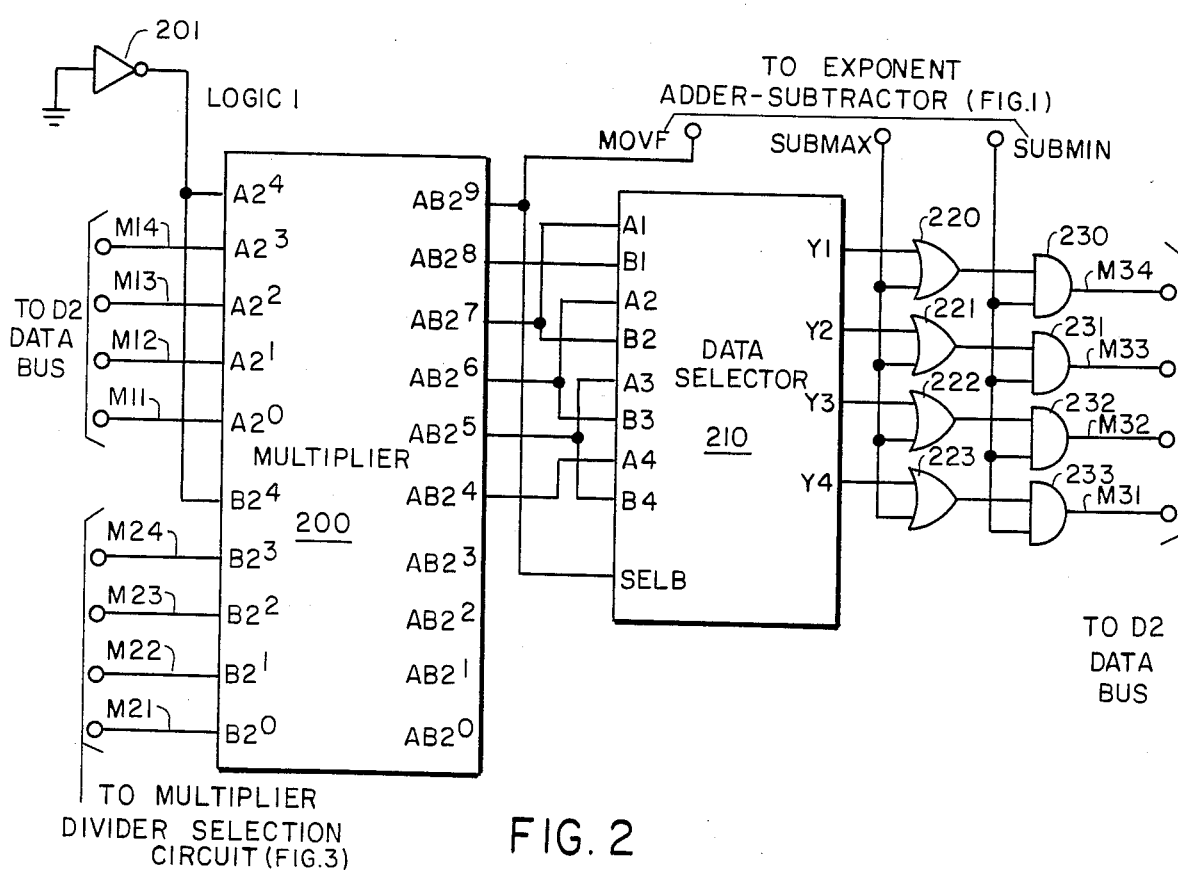
FIG. 2 of the accompanying drawing is a combined block and logic diagram of the mantissa multiplier circuit of the present invention.

Referring now to FIG. 2 the mantissa multiplier circuit of the present invention is shown. Multiplier 200 includes inputs $A2^0$-$A2^3$ which are connected to the D2 data bus via leads M11-M14, respectively. This multiplier also includes inputs $B2^0$-$B2^3$ which are connected to the multiplier-divider selection circuit via leads M21-M24, respectively. Inputs $A2^4$ and $B2^4$ are connected to ground via inverter 201 and thus a logic level 1 signal appears at these inputs. Multiplier 200 also includes outputs $AB2^0$-$AB2^9$.

Data selector 210 includes inputs A1-A4, B1-B4 and select (SEL) B. The SEL B input is connected to the $AB2^9$ output of multiplier 200 via the mantissa overflow (MOVF) lead which is also connected to the exponent adder-subtractor circuit of FIG. 1. Output $AB2^8$ of multiplier 200 is connected to input B1 of data selector 210; output $AB2^7$ of multiplier 200 is connected to inputs A1 and B2 of data selector 210 and output $AB2^6$ of multiplier 200 is connected to inputs A2 and B3 of data selector 210. Output $AB2^5$ of multiplier 200 is connected to inputs A3 and B4 of data selector 210 and output $AB2^4$ of multiplier 200 is connected to input A4 of data selector 210.

This data selector also includes outputs Y1-Y4 which are connected to the first input of OR gates 220-223, resectively. These OR gates are connected to the first input of AND gates 230-233 which are connected to the D2 data bus via leads M34-M31, respectively. OR gates 220-223 have their second input connected to the exponent adder-subtractor circuit of FIG. 1 via the SUBMAX lead while AND gates 230-233 have their second input connected to the exponent adder-subtractor circuit of FIG. 1 via the SUBMIN lead.

Since the mantissas of words #1 and #2 are normalized, the logic level 1 signals for the implied bit positions must be entered into the multiplication process. Such logic level 1 implied bit values appear at the $A2^4$ and $B2^4$ inputs of multiplier 200. The fractional bit values for the mantissa of Word #1 then appear at inputs $A2^0$-$A2^3$ via leads M11-M14, respectively, and the fractional bit values for the mantissa of Word #2 appear at the $B2^0$-$B2^3$ inputs via leads M21-M24, respectively.

When two normalized numbers, 1+X1 and 1+X2, are multiplied together they produce a product of 1+X1X2+X1X2. Both X1 and X2 are greater than or equal to 0 and less than or equal to 15/16ths. If X1+X2+X1X2 is less than 1, a carry condition will not occur at output $AB2^9$ of multiplier 200. Consequently, there is no multiplication overflow and the product mantissa does not need to be shifted.

If X1+X2+X1X2 is greater than 1, for example when X1=X2=½, a carry condition does occur and a logic level 1 signal appears at the $AB2^9$ output. This signal indicates that the multiplier circuit has overflowed and that the mantissa of the product/quotient is greater than 2. Thus the exponent for the product/quotient must be increased by 1 and the mantissa for the product/quotient must be divided by 2. Such division by 2 is accomplished by shifting the mantissa by one bit position to the right.

Therefore, the implied bit is shifted into the most significant bit of the product/quotient word and the most significant bit is shifted into the next most significant bit position, etc. This shifting operation is performed by data selector 210. When a logic level 1 signal appears on the multiplication overflow (MOVF) lead, this signal appears at the select (SEL) B input of data selector 210. Consequently, data selector 210 gates the signals appearing at its B1-B4 inputs to the Y1-Y4 outputs, respectively. If a logic level 0 signal appears on the MOVF lead and therefore at the SEL B input, data selector 210 does not perform a shifting operation and consequently it gates the signals appearing at its A1-A4 inputs to the Y1-Y4 outputs, respectively.

The exponent is incremented by 1 since the logic level 1 signal appearing on the MOVF lead also appears at the carry (C1) input of the exponent adder-subtractor circuit of FIG. 1.

Thus, multiplier 200 multiplies the normalized mantissa of Word #1 by the normalized mantissa of Word #2. The four most significant fractional bits of the product/quotient word then appear at bits $AB2^7$-$AB2^4$ and implied bit appears at outputs $AB2^8$. If there is an overflow condition, then the product/quotient word is greater than or equal to two and the overflow bit appears at the $AB2^9$ output.

When no overflow occurs no shifting of the mantissa is required and consequently the implied bit is dropped since only fractional mantissa bits appearing at outputs $AB2^7$-$AB2^4$ appear at inputs A1-A4 of data selector 210. Under this "no overflow" condition the signals appearing at inputs A1-A4 are gated directly to outputs $2^7$-$2^4$.

If there is an overflow condition the product/quotient mantissa is shifted down by one bit position and the implied bit is then shifted into the most significant fractional bit position. This implied bit appearing at the $AB2^8$ output then appears at the B1 input of data selector 210. The three most significant fractional bits of the product/quotient word appearing at outputs $AB2^7$-$AB2^5$ of multiplier 200 then appear at inputs B2-B4, respectively. Under these conditions an overflow does occur so the B inputs are selected and therefore gated to outputs Y1-Y4 of data selector 210.

When it is determined that minimum or maximum values must be provided in the mantissa bits of the output word, either a logic level 0 signal appears on the SUBMIN lead to force the mantissa bits to the minimum value or a logic level 1 signal appears on the SUBMAX lead to force the output word mantissa bits to the maximum value.

When it is intended to provide the maximum value for the mantissa bits the logic level 1 signal on the SUBMAX lead causes OR gates 220-223 to apply logic level 1 signals to the first input of AND gates 230-233. Since a logiclevel 1 signal appears on the SUBMIN lead under these conditions, AND gates 230-233 then apply logic level 1 signals to the D2 data bus via leads M34-M31, thereby indicating that the fractional mantissa bits of the Word #3 mantissa all have a value of one.

If it is determined that the iutput mantissa should have the minimum value, then a logic level 0 signal appears on the SUBMIN lead and consequently AND gates 230-233 apply logic level 0 signals to the D2 data bus via leads M34-M31, thereby indicating that the fractional mantissa bits of the output word have the minimum value of all zeros.

In the event that the mantissa bits of Word #3 do not need to be forced to the minimum or maximum values than a logic level 0 signal appears on the SUBMAX lead and a logic level 1 signal appears on the SUBMIN lead. Consequently, the output signals from data selector 210 are gated by OR gates 220-223 to AND gates 230-233 which then apply them directly to the D2 data bus via leads M34-M31.

Figure 3:
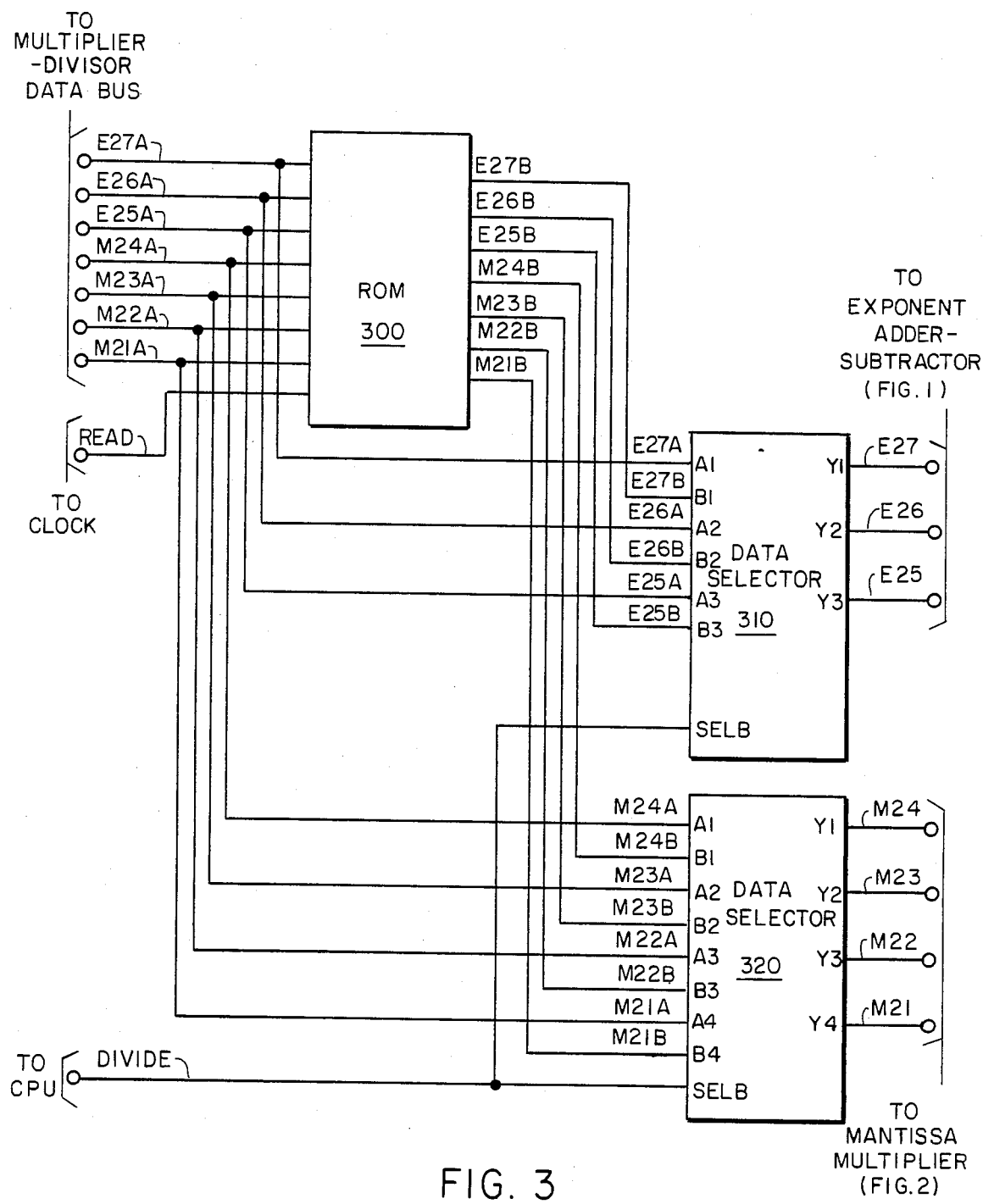
FIG. 3 of the accompanying drawing is a block diagram of the multiplier/divider selection circuit of the present invention.

Referring now to FIG. 3 the multiplier-divider selection circuit of the present invention is shown. Read-only-memory 300 is connected to the multiplier-divider data bus via leads E27A-E25A, and M24A-AM21A. This read-only-memory is also connected to a clock via the READ lead. Read-only-memory 300 also has outputs connected to leads E27B-E25B and M24B-M21B.

Data selector 310 has inputs A1, A2 and A3 connected to the multiplier-divider data bus via leads E27A, E26A, and E25A, respectively. This data selector also has inputs B1, B2 and B3 connected to read-only-memory 300 via leads E27B, E26B and E25B, respectively. Similarly, data selector 320 has inputs A1-A4 connected to the multiplier-divider data bus via leads M24A-M21A, respectively, and inputs B1-B4 connected to read-only-memory 300 via leads M24B-M21B, respectively. The outputs of data selector 310 are connected to the exponent adder-subtractor circuit of FIG. 1 via leads E27, E26 and E25 while the outputs of data selector 320 are connected to the mantissa multiplier circuit of FIG. 2 via leads M24-M21.

Division is accomplished through multiplication with the reciprocal of the divisor. Thus the previously described multiplication operations apply equally to the division operation when the reciprocal of the divisor is used as the multiplier. Read-only-memory 300 is a 128 word by 8 bit memory. This memory contains 7 bit words that are the reciprocals of the 7 bit divisor words.

The 7 divisor bits appearing on leads E27A-E25A and M24A-M21A are used as address bits for read-only-memory 300. Upon receipt of a periodic read signal from the clock circuit, read-only-memory 300 provides a 7 bit word which is the reciprocal of the address of that word. Thus, the signals appearing on leads E27B-E25B and M24B-M21B represent the reciprocal of the signals appearing on leads E27A-E25A and M24A-M21A, respectively.

The select (SEL) B inputs of data selectors 310 and 320 are also connected to the multiplier/divisor data bus via the DIVIDE lead. These data selectors determine whether to provide the multiplier or a reciprocal divisor at their outputs, depending upon whether a logic level 0 signal or logic level 1 signal appears on the DIVIDE lead. When a logic level 0 signal appears at the SEL B inputs via the DIVIDE lead, data selectors 310 and 320 gate the signals appearing at their A1-A3 and A1-A4 inputs, respectively, to their outputs. Similarly, when a logic level 1 signal appears at the SEL B inputs via the DIVIDE lead, data selectors 310 and 320 gate the signals appearing at their B1-B3 and B1-B4 inputs, respectively, to their outputs.

Thus, data selectors 310 and 320 gate the multiplier exponent and mantissa bits to exponent leads E27-E25 and mantissa leads M24-M21, respectively, when a logic level 0 signal appears on the DIVIDE lead. Similarly, when a logic level 1 signal appears on the DIVIDE lead, data selectors 310 and 320 gate exponent and mantissa bits, representative of the reciprocal of the divisor, to exponent leads E27-E25 and mantissa leads M24-M21, respectively.

Thus data selector 310 applies the exponent bits of the multiplier to the exponent adder-subtractor circuit of FIG. 1 when a multiplication operation is to be performed. It also applies the exponent bits of the reciprocal of the divisor to the exponent adder-subtractor when a divide operation is to be performed. Similarly, data selector 320 applies the mantissa bits of the multiplier word to the mantissa multiplier circuit of FIG. 2 when a multiplication operation is to be performed and it applies the mantissa bits of the reciprocal of the divisor to the mantissa multiplier when a divide operation is to be performed.

Figure 4:
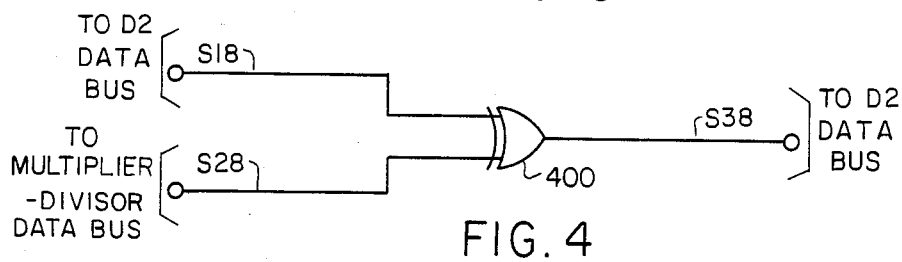
FIG. 4 of the accompanying drawing is a logic diagram of the sign generator circuit of the present invention.

Referring now to FIG. 4 the sign generator circuit of the present invention is shown. Exclusive-OR gate 400 is used to determine the sign of the product or quotient. This exclusive-OR gate is connected to the D2 data bus via lead S18 and to the multiplier-divider data bus via lead S28. The signal appearing on lead S18 represents the sign of the D2 PCM sample word (Word #1) and the signal appearing on the S28 lead represents the sign bit of the multiplier or divider word (Word #2).

When multiplying or dividing, if the sign bit of the two operands are identical, then the sign bit of the product or quotient is positive. However, if the sign bits of the two operands are different during a multiplication or division operation, then the sign bit of the product or quotient is negative. Consequently, exclusive-OR gate 400 provides a logic level 0 signal, when represents a positive sign bit, when either logic level 0 or 1 signals appear on both the S18 and S28 leads. However, exclusive-OR gate 400 provides a logic level 1 signal (negative sign bit) on lead S3 when the signals appearing on the S18 and S28 leads are different. The sign bit for the product/quotient word (Word #3) is then applied by exclusive-OR gate 400 to the D2 data bus via lead S38.

Thus the multiplier-divider circuit of the present invention utilizes an adder circuit to add or subtract the exponents of the multiplicand and multiplier, or dividend and divisor, respectively. In this application the exponents are added/subtracted directly even though one of the operands is in two's-complement format and the other is in one's-complement format although other methods of addition/subtraction could have been employed. In the event that the resultant addition/subtraction of the exponents is greater than or smaller than predetermined maximum and values, additional circuitry ensures that the exponent of the product/quotient word does not exceed the predetermined minimum and maximum values. The present invention also includes a multiplier circuit which multiplies the mantissas of the two operands and limits the mantissa of the product/quotient word to predetermined minimum and maximum values. A read-only-memory is used to provide a reciprocal of the divisor word, so that division can be accomplished through multiplication with such reciprocal, and an exclusive-OR gate is used to determine the sign bit for the resultant product/quotient word.

It will be obvious to those skilled in the art that numerous modifications of the present invention can be made without departing from the spirit of the invention which shall be limited only by the scope of the claims appended hereto.

What is claimed is:

1. A multiplier/divider circuit for use in a digital signal processing system which includes a processing unit operated to provide multiply and divide control signals, a source of pulse code modulation (PCM) samples and a source of multiplier/divisor numbers, each sample and number having a sign bit, a plurality of exponent bits and a plurality of mantissa bits, said multiplier/divider circuit comprising:

a read-only-memory (ROM) connected to said source of multiplier/divisor numbers and operated in response to each of said numbers to provide the reciprocal thereof;

a data selection circit connected to said processing unit, to said ROM and to said source of multiplier/divisor numbers;

an adder circuit connected to said source of PCM samples and said data selection circuit; and a multiplication circuit connected to said source of PCM samples and said data selection circuit;

said data selection circuit being operated in response to said multiply control signal to gate said multiplier/divisor exponent bits to said adder circuit and said multiplier/divisor mantissa bits to said multiplication circuit, whereby said gated multiplier/divisor represents a multiplier, said data selection circuit being further operated in response to said divide control signal to gate said exponent bits of said reciprocal to said adder circuit and said mantissa bits of said reciprocal to said multiplication circuit, whereby said gated reciprocal represents the reciprocal of a divisor;

said adder circuit being operated to add said multiplier exponent bits to said PCM sample exponent bits and provide a plurality of first summation signals representative of the results of said addition;

said multiplication circuit being operated to multiply said multiplier mantissa bits by said PCM sample mantissa bits and provide a plurality of first multiplication signals representative of the results of said multiplication;

whereby said adder circuit and multiplication circuit effectuate multiplication of said PCM sample and said multiplier;

said adder circuit being further operated to add said exponent bits of said divisor reciprocal to said PCM sample exponent bits and provide a plurality of second summation signals representative of the results of said addition;

said multiplication circuit being further operated to multiply said mantissa bits of said divisor reciprocal by said PCM sample mantissa bits and provide a plurality of second multiplication signals representative of the results of said multiplication;

whereby said adder circuit and said multiplication circuit effectate division of said PCM sample by said divisor.

2. A multiplier/divider circuit as claimed in claim 1, wherein said adder circuit is further operated in response to said first and second summation signals having a value in excess of a predetermined threshold to provide an exponent overflow signal.

3. A multiplier/divider circuit as claimed in claim 2, wherein there is further included, a minimax gating circuit connected to said adder circuit and said source of multiplier/divisor numbers, and operated in response to the most significant exponent bit of said multiplier/divisor numbers having a first characteristic and said exponent overflow signal of a second characteristic, to provide a first substitution signal;

and further operated in response to the most significant exponent bit of said multiplier/divisor numbers having a second characteristic and said exponent overflow signal of a first characteristic to provide a second substitution signal.

4. A multiplier/divider circuit as claimed in claim 3, wherein said minimax gating circuit comprises:

a first inverter connected to said adder circuit and a NAND gate connected to said first inverter and said source of multiplier/divisor numbers, said NAND gate being operated to provide said first substitution signal; and a second inverter connected to said source of multiplier/divisor numbers and an AND gate connected to said second inverter and said adder circuit, said AND gate being operated to provide said second substitution signal.

5. A multiplier/divider circuit as claimed in claim 3, wherein there is further included:

adder gating means connected to said adder circuit and said minimax gating circuit; and a data bus connected to said adder gating circuit;

said adder gating circuit being operated in response to an absence of said first and second substitution signals to gate said first and second summation signals to said data bus, and further operated in response to said first substitution signal to provide predetermined gated summation signals of a first characteristic, and further operated in response to said second substitution signal to provide predetermined gated summation signals of a second characteristic.

6. A multiplier/divider circuit as claimed in claim 5, wherein said adder gating circuit comprises;

a first plurality of gating circuits, each having a first input connected to said adder circuit and a second input connected to said minimax gating circuit; and a second plurality of gating circuits, each having a first input connected to a corresponding one of said first gating circuits, a second input connected to said minimax gating circuit, and an output connected to said data bus;

said first plurality of gating circuits being operated in response to an absence of said second substitution signal to gate said first and second summation signals to said second plurality of gating circuits and further operated in response to said second substitution signal to provide said predetermined gated summation signals of a second characteristic;

said second plurality of gating circuits being operated in response to an absence of said first substitution signal to gate said first and second summation signals and said predetermined gated summation signals of a second characteristic to said data bus and further operated in response to said first substitution signal to apply said predetermind gated summation signals of a first characteristic to said data bus.

7. A multiplier/divider circuit as claimed in claim 6, wherein said first plurality of gating circuits comprises a plurality of OR gates and said second plurality of gating circuits comprises a plurality of AND gates.

8. A multiplier/divider circuit as claimed in claim 3, wherein there is further included:

a multiplication gating circuit connected to said multiplication circuit and said minimax gating circuit; and a data bus connected to said multiplication gating circuit;

said multiplication gating circuit being operated in response to an absence of said first and second substitution signals to gate said first and second multiplication signals to said data bus, and further operated in response to said first substitution signal to provide predetermined gated multiplication signals of a first characteristic, and further operated in response to said second substitution signal to provide predetermined gated summation signals of a second characteristic.

9. A multiplier/divider circuit as claimed in claim 8, wherein said multiplication gating circuit comprises;
a first plurality of gating circuits, each having a first input connected to said multiplication circuit and a second input connected to said minimax gating circuit; and
a second plurality of gating circuits each having a first input connected to a corresponding one of said first gating circuits, a second input connected to said minimax gating circuit, and an output connected to said data bus,
said first plurality of gating circuits being operated in response to an absence of said second substitution signal to gate said first and second multiplication signals to said second plurality of gating circuits and further operated in response to said second substitution signal to provide said predetermined gated multiplication signals of a second characteristic;
said second plurality of gating circuits being operated in response to an absence of said first substitution signal to gate said first and second multiplication signals and said predetermined gated multiplication signals of a second characteristic to said data bus and further operated in response to said first substitution signal to apply said predetermined gated multiplication signals of a first characteristic to said data bus.

10. A multiplier/divider circuit as claimed in claim 9, wherein said first plurality of gating circuits comprises a plurality of OR gates and said second plurality of gating circuits comprises a plurality of AND gates.

11. A multiplier/divider circuit as claimed in claim 1, wherein said multiplication circuit comprises:
a multiplier connected to said source of PCM samples and said data selection circuit and operated to provide first product signals representative of the multiplication of said multiplier mantissa bits by said PCM sample mantissa bits and to further provide second product signals representative of the multiplication of said mantissa bits of said divisor reciprocal by said PCM sample mantissa bits; and
a data selector connected to said multiplier and operated in response to said first and second product signals having a value that does not exceed a predetermined threshold to provide said first and second multiplication signals, respectively,
and further operated in response to said first and second product signals having a value that does exceed said predetermined threshold to down shift said first and second product signals by one bit position, whereby said data selector provides said first and second multiplication signals representative of said first and second product signals, respectively, as divided by a value of two.

12. A multiplier/divider circuit as claimed in claim 11, wherein said adder circuit is further connected to said multiplier and is further operated in response to said first and second product signals having a value that exceeds said predetermined threshold to add a value of one to said first and second summation signals, respectively.

13. A multiplier/divider circuit as claimed in claim 11, wherein there is further included an inverter connected to ground and said multiplier has first and second implied bit inputs connected to said inverter, PCM sample inputs connected to said source of PCM samples and associated with said first implied bit input, and multiplier/divisor inputs connected to said data selection circuit and associated with said second implied bit input, whereby said multiplier multiplies a PCM sample value having an implied integer bit and a plurality of fractional mantissa bits by a multiplier/divisor number having an implied integer bit and a plurality of fractional mantissa bits.

14. A multiplier/divider circuit as claimed in claim 11, wherein said data selector comprises a plurality of AND gates.

15. A multiplier/divider circuit as claimed in claim 1, wherein said data selection circuit comprises a plurality of AND gates.

16. A multiplier/divider circuit as claimed in claim 1, wherein there is further included a sign bit generator connected to said source of PCM samples and said data selection circuit, and operated in response to said PCM sample sign bit and said multiplier/divisor sign bit being of equal value to provide a multiplication sign bit of a first characteristic, and further operated in response to said PCM sample sign bit and said multiplier/divisor sign bit being of different values to provide a multiplication sign bit of a second characteristic.

17. A multiplier/divider circuit as claimed in claim 16, wherein said sign bit generator comprises an exclusive-OR gate.

* * * * *